United States Patent
Cho (10) Patent No.: US 8,099,951 B2
(45) Date of Patent: Jan. 24, 2012

(54) DUAL BED CATALYST SYSTEM FOR NOX REDUCTION IN LEAN-BURN ENGINE EXHAUST

(75) Inventor: Byong Kwon Cho, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 597 days.

(21) Appl. No.: 12/276,487

(22) Filed: Nov. 24, 2008

(65) Prior Publication Data

US 2010/0126143 A1    May 27, 2010

(51) Int. Cl.
*F01N 3/10* (2006.01)
(52) U.S. Cl. ............ 60/301; 60/274; 60/286; 422/177
(58) Field of Classification Search ............ 60/274, 60/301, 386; 422/177, 180; 502/317, 341, 502/354, 223
See application file for complete search history.

(56) References Cited

U.S. PATENT DOCUMENTS

| | | | |
|---|---|---|---|
| 6,957,528 B1 * | 10/2005 | Cho | 60/275 |
| 2004/0076565 A1 | 4/2004 | Gandhi et al. | |
| 2006/0283175 A1 | 12/2006 | Cho et al. | |
| 2008/0127634 A1 * | 6/2008 | Cho et al. | 60/286 |

FOREIGN PATENT DOCUMENTS

CN   101259377 A   9/2008
JP   2008018374 A   1/2008

* cited by examiner

*Primary Examiner* — Kenneth Bomberg
*Assistant Examiner* — Abdul Elnoubi (57) ABSTRACT

A method for reducing nitrogen oxides including NO and $NO_2$ in an exhaust stream also including oxygen, carbon monoxide and hydrocarbons at a temperature above about 150° C. includes oxidizing NO in the exhaust stream to $NO_2$, adding diesel fuel hydrocarbons and their oxygenates to the exhaust stream for the reduction of nitrogen oxides, and flowing the exhaust stream through a dual bed catalyst system including a first bed and a second bed, wherein the first bed is a single layer catalyst bed and the second bed is a double layer catalyst bed including a first layer and a second layer to reduce the nitrogen oxides to $N_2$.

22 Claims, 7 Drawing Sheets

DUAL BED CATALYST SYSTEM FOR NOX REDUCTION IN LEAN-BURN ENGINE EXHAUST

TECHNICAL FIELD

The present disclosure relates generally to treatment of exhaust gas from a hydrocarbon fueled power source, such as a diesel engine, operated with a fuel-lean combustion mixture.

BACKGROUND

The statements in this section merely provide background information related to the present disclosure and may not constitute prior art.

Diesel engines are operated at higher than stoichiometric air-to-fuel mass ratios for improved fuel economy. Such lean-burning engines produce a hot exhaust with a relatively high content of oxygen and nitrogen oxides (NOx). The temperature of the exhaust from a warmed-up diesel engine is typically in the range of about 200° C. to about 400° C. and has a representative composition, by volume, of about 10% to about 17% oxygen, about 3% carbon dioxide, about 0.1% carbon monoxide, about 180 parts per million (ppm) hydrocarbons, about 235 ppm NOx and the balance nitrogen and water.

The NOx gases, typically comprising nitric oxide (NO) and nitrogen dioxide ($NO_2$) are difficult to reduce to nitrogen ($N_2$) because of the high oxygen ($O_2$) content in the hot exhaust stream. NOx reduction technologies in automotive lean-burn engine exhausts include selective catalytic reduction by urea (urea/SCR) and lean NOx trap (LNT) technologies. However, these technologies have limitations for their implementation in vehicles. The urea/SCR technology requires an infrastructure for urea distribution, storage and delivery, while the LNT technology requires a sophisticated engine control technology and frequent regeneration of catalysts due to sulfur poisoning.

General Motors Corporation has developed a hydrocarbon plus oxygenated hydrocarbon/selective catalytic reduction (HC+OHC)/SCR technology that uses onboard diesel fuel as the source of the NOx reductant. For example, U.S. Patent Publication 20080127634, published Jun. 5, 2008, corresponding to application Ser. No. 11/566,693, the disclosure of which is incorporated herein by reference, describes, in embodiments, a method for reducing nitrogen oxides including NO and $NO_2$ in an exhaust stream also comprising oxygen, carbon monoxide and hydrocarbons at a temperature above about 150° C., the method including, in embodiments: oxidizing NO in the exhaust stream to $NO_2$; reforming raw diesel fuel to produce OHC's from the fuel; adding diesel fuel hydrocarbons and their oxygenates to the exhaust stream for the reduction of nitrogen oxides; and contacting the exhaust stream with a hybrid reduction catalyst comprising BaY—Ag/$Al_2O_3$ to reduce the nitrogen oxides to $N_2$. The method reduces NOx initially through the (HC+OHC)/SCR process producing $N_2$, while also producing $NH_3$ as a byproduct over Ag/$Al_2O_3$. The $NH_3$ subsequently reduces NOx over the BaY—Ag/$Al_2O_3$ hybrid catalyst through the $NH_3$/SCR process, producing more $N_2$ and thereby enhancing the NOx reduction efficiency of the hybrid catalyst system.

The appropriate components and process aspects of each of the foregoing U.S. Patents and Applications may be selected for the present disclosure in embodiments thereof.

SUMMARY

A method for reducing nitrogen oxides including NO and $NO_2$ in an exhaust stream also including oxygen, carbon monoxide and hydrocarbons at a temperature above about 150° C. includes oxidizing NO in the exhaust stream to $NO_2$, adding diesel fuel hydrocarbons and their oxygenates to the exhaust stream for the reduction of nitrogen oxides, and flowing the exhaust stream through a dual bed catalyst system including a first bed and a second bed, wherein the first bed is a single layer catalyst bed and the second bed is a double layer catalyst bed including a first layer and a second layer to reduce the nitrogen oxides to $N_2$.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a dual bed catalyst system containing a double-layer catalyst for improved NOx reduction using on-board diesel fuel hydrocarbons as the source of the NOx reductant is disclosed. While described herein with reference to a dual bed system, multiple catalyst beds are contemplated as within the scope of the present disclosure. Embodiments disclosed herein include a method for reducing nitrogen oxides including NO and $NO_2$ in an exhaust stream also comprising oxygen, carbon monoxide and hydrocarbons at a temperature above about 150° C., the method comprising: oxidizing NO in the exhaust stream to $NO_2$; adding diesel fuel hydrocarbons and their oxygenates to the exhaust stream for the reduction of nitrogen oxides; and contacting the exhaust stream with a dual bed catalyst system comprising a first bed and a second bed; wherein the first bed is a single layer catalyst bed and the second bed is a double layer catalyst bed comprising a first layer and a second layer to reduce the nitrogen oxides to $N_2$.

The components of the dual bed catalyst system can be selected from any suitable components including but not limited to the following. In embodiments, the catalyst system is made of multiple catalyst beds, for example a dual bed system, with each bed containing a single or multilayer catalyst. For example, the first bed can comprise a single layer catalyst selected from but not limited to $Ag/Al_2O_3$, Ag/Y, Ag/ZSM5, Ag/Ba/Y, or a combination thereof, and the second bed can comprise a double layer catalyst wherein the first layer is selected from but not limited to $Ag/Al_2O_3$, Ag/Y, Ag/ZSM5, Ag/Ba/Y, or a combination thereof, and the second layer is selected from but not limited to $Pt/Al_2O_3$, $Pt/Ba/Al_2O_3$, Cu/ZSM5, CuCo/Y, $Pd/Al_2O_3$, or a combination thereof. Other multilayered catalyst formulations containing $Ag/Al_2O_3$, CuCo/Y and $Pd/Al_2O_3$ layers are contemplated as within the scope of the present disclosure. In a selected embodiment, the dual bed catalyst includes a first bed comprising a single layer catalyst of $Ag/Al_2O_3$ and a second bed comprising a double layer catalyst having a first layer and a second layer, wherein the first layer is $Ag/Al_2O_3$ and the second layer is $Pt/Al_2O_3$.

Oxidizing NO in the exhaust stream to $NO_2$ can comprise, in embodiments, for example, treating the exhaust stream with an oxidation catalyst or passing air through a non-thermal plasma reactor to generate an ozone-containing plasma and adding the plasma to the exhaust stream for oxidation of NO to $NO_2$. In embodiments, oxidizing NO in the exhaust stream to $NO_2$ comprises treating the exhaust stream with an oxidation catalyst including, but not limited to, for example, an oxidation catalyst selected from the noble metals group including Pt, Pd, Rh, and mixtures and combinations thereof. The method herein can comprise adding an OHC to the exhaust stream as vapor in an air stream. In embodiments, ethanol can be added to the exhaust stream as ethanol vapor in an air stream. Alternately, ethanol, dodecane, or a mixture thereof can be added to the exhaust stream.

In embodiments, the method comprises reducing nitrogen oxides including NO and $NO_2$ in an exhaust stream also comprising oxygen, carbon monoxide and hydrocarbons at a temperature above about 200° C., above about 225° C., or above about 250° C. In embodiments, reducing nitrogen oxides including NO and $NO_2$ in an exhaust stream comprises a continuous NOx reduction. In embodiments, the dual bed catalyst herein continuously produces $NH_3$ as a by-product. In embodiments, the multilayer catalyst is a dual bed catalyst, the dual bed catalyst continuously produces $NH_3$ as a by-product and the produced $NH_3$ continuously reacts with NOx over the dual bed catalyst to produce $N_2$. Further, in embodiments, the emission level of undesirable nitrogen-containing species such as $NH_3$ in the outlet stream of the dual bed catalyst is suppressed, with a slightly increased formation of $N_2O$.

Figures 1, 2, 3:
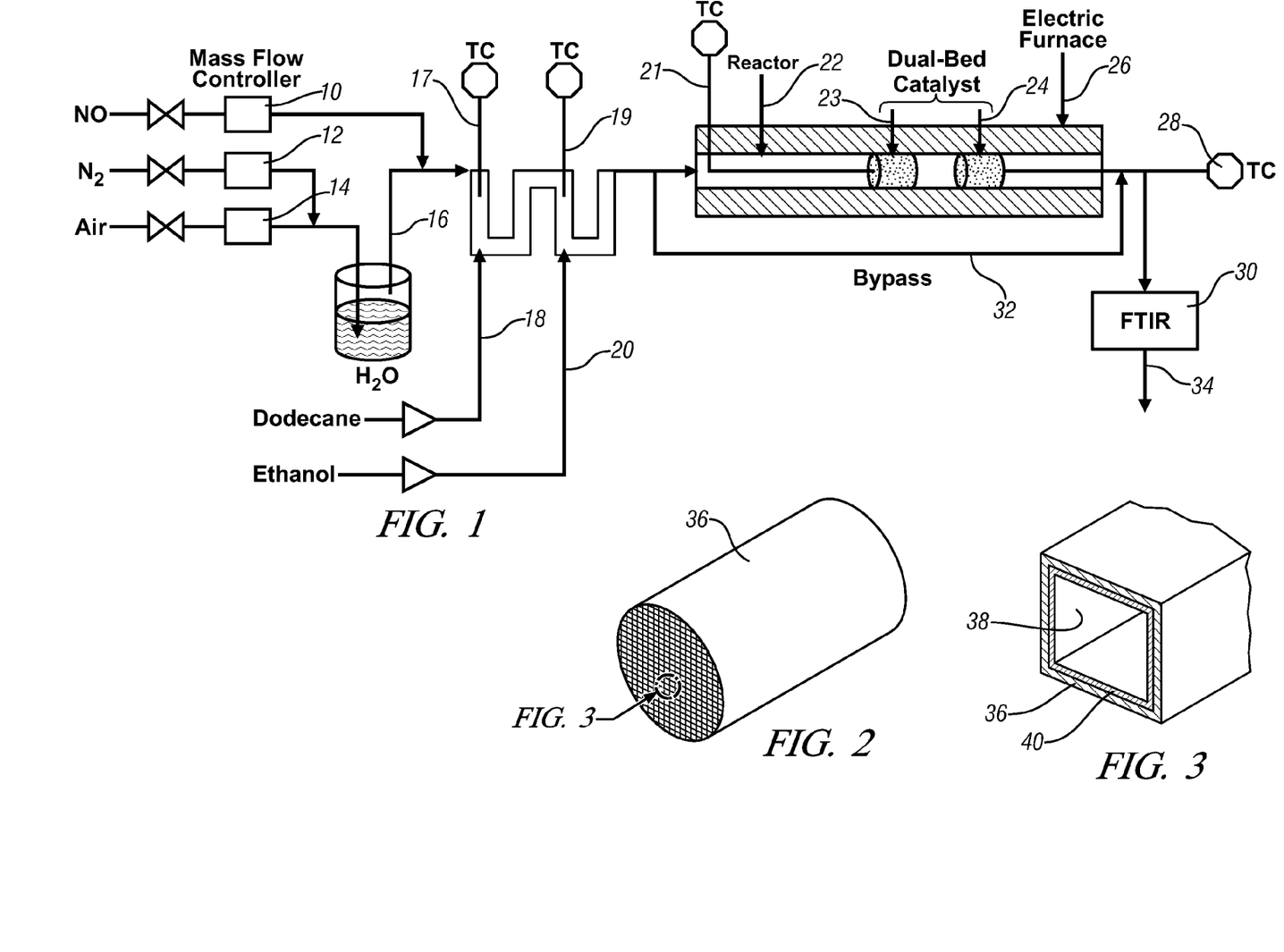
FIG. 1 is a schematic flow diagram of a laboratory reactor system.
FIG. 2 is a diagram showing a honeycomb monolith substrate having a single layer catalyst.
FIG. 3 is an enlarged view of a portion of FIG. 2 showing a single flow channel of the honeycomb monolith substrate having a single-layer catalyst.

FIG. 1 illustrates schematically a practice of the present disclosure. A comparative single layer catalyst containing $Ag/Al_2O_3$ (catalyst A) as well as a multilayered catalyst containing both $Ag/Al_2O_3$ and $Pt/Al_2O_3$ layers (catalyst B) have been prepared. Superior performance of the present dual-bed catalyst system containing both catalysts A and B for NOx reduction has been demonstrated in a laboratory reactor system using a simulated diesel exhaust stream. Catalyst formulations for both single layer and double layer catalysts are shown in Table 1. Table 2 provides the experimental conditions used to demonstrate the NOx conversion performance of the present dual bed catalyst in the laboratory reactor experiments. Diesel engines are typically operated at air-to-fuel mass ratios that are considerably higher than the stoichiometric ratio of air to fuel, and the exhaust gas thus contains an appreciable amount of unreacted $O_2$ as well as $N_2$ (from the air). The temperature of the exhaust from a warmed-up engine is typically in the range of about 200° C. to about 400° C. The disclosure is illustrated in the case of a diesel engine but it is to be understood that the subject method and dual bed catalyst could be used to treat the exhaust of other lean-burn hydrocarbon-fueled power sources if diesel fuel is available for the exhaust treatment. In diesel engine exhaust, in addition to $O_2$ and $N_2$, the hot gas also contains CO, $CO_2$, $H_2O$ and hydrocarbons (some in particulate form) that are not completely burned. Embodiments disclosed herein include a method for reducing nitrogen oxides including NO and $NO_2$ in an exhaust stream also comprising oxygen, carbon monoxide and hydrocarbons at a temperature above about 150° C., the method comprising: oxidizing NO in the exhaust stream to $NO_2$; adding diesel fuel hydrocarbons to the exhaust stream for the reduction of nitrogen oxides; and contacting the exhaust stream with a dual bed catalyst comprising to reduce the nitrogen oxides to $N_2$.

TABLE 1

Catalyst Formulations

| Catalysts | Metal Contents (Wt. %) | |
| --- | --- | --- |
| | Ag | Pt |
| Ag/alumina | 3.0 | — |
| Ag/alumina-on-Pt/alumina | 3.0 | 5.0 |

In embodiments, the first bed of the dual bed catalyst comprises a single layer of Ag/alumina or other selected catalyst, containing from about 2 to about 4 weight percent Ag in the case of Ag/alumina catalyst. In embodiments, the second bed of the dual bed catalyst comprises a first layer (the top layer) of Ag/alumina containing about 2 to about 4 weight percent Ag, or other selected catalyst for the first layer, and a second layer (the bottom layer) of Pt/alumina containing from about 0.5 to about 5 weight percent Pt, or other selected catalyst for the second layer. In a specific embodiment, the first bed comprises a single layer of Ag/alumina containing about 3 weight percent Ag, and the second bed comprises a first layer of Ag/alumina containing about 3 weight percent Ag and a second layer of Pt/alumina containing about 5 weight percent Pt.

The single layer Ag/Al$_2$O$_3$ catalyst (3 wt. % Ag) was prepared by impregnating Ag on gamma-alumina using AgNO$_3$ as the precursor. This powder catalyst was made into slurry by mixing with alumina binder, followed by coating onto a cordierite honeycomb monolith (3/8 inch (9.53 mm) o.d.×1 inch (25 mm) long, 600 cells/in$^2$ (93 cells/cm$^2$). The double layer catalyst containing Ag/Al$_2$O$_3$ on the top layer and Pt/Al$_2$O$_3$ on the bottom layer was made by overcoating the AG/Al$_2$O$_3$ slurry on the honeycomb monolith precoated with Pt/Al$_2$O$_3$ (5 wt. % Pt) obtained from Engelhard Corp. Prior to activity measurements, the catalysts were pretreated with air flow at 500° C. for 2 hours. Detailed experimental conditions used in the laboratory microreactor are shown in Table 2.

TABLE 2

Experimental Conditions for Laboratory Reactor Tests

| | |
|---|---|
| Catalysts: coated on cordierite honeycomb monolith | Catalyst A: Ag/alumina single layer catalyst<br>Catalyst B: Ag/alumina-on-Pt/alumina double layer catalyst<br>Catalyst C: Combination of Catalyst A and Catalyst B |
| Catalyst bed configuration | Single Bed Catalyst: Catalyst A or B<br>Dual Bed Catalyst: Catalyst C |
| Catalyst Temperature | 150-500° C. |
| Honeycomb Monolith | 3/8" o.d. with 600 cpi<br>1" long (total length) |
| Total flow rate | 200 cc/minute |
| Reactor space velocity | 7,000 h$^{-1}$ |
| Feed gas composition | 200 ppm NO<br>6% O$_2$<br>2.5% H$_2$O<br>N$_2$ balance<br>C1/N = 8<br>133 ppm Dodecane, or<br>67 ppm Dodecane + 400 ppm Ethanol [C$_1$ ratio (D/E) = 1] |

A 1:1 mixture (on the C$_1$ basis) of dodecane and ethanol was used as the NOx reductant. Dodecane was selected as a representative of diesel fuel hydrocarbon (HC), while ethanol was chosen as a representative of partially oxidized hydrocarbon (OHC). The overall C$_1$/NOx feed ratio to the catalyst was kept constant at 8.

FIG. 1 shows the schematic flow diagram of the laboratory reactor system used to measure the NOx reduction performance of various catalysts in the Diesel/SCR process where simulated diesel fuel was used as the reductant. Catalytic activity was measured between 150 and 500° C. in a fixed-bed flow reactor containing monolithic honeycomb catalysts at atmospheric pressure. The feed reactant flow to the catalyst contained 200 ppm NO, 6% O$_2$, 2.5% H$_2$O, 133 ppm dodecane (or a mixture of 67 ppm dodecane and 400 ppm ethanol) and balance N$_2$. Note that either dodecane alone or the mixture of dodecane and ethanol maintains the carbon/NOx feed ratio of 8. Here dodecane was used as a representative diesel fuel hydrocarbon, while the mixture of dodecane and ethanol was used as a representative diesel fuel hydrocarbon reformed by an air plasma. See commonly assigned U.S. Ser. No. 11/155,179, of Byong Cho, entitled "Continuous Reforming of Diesel Fuel for NOx Reduction" (U.S. Patent Publication 2006/0283175, Published Dec. 21, 2006), which is hereby incorporated by reference herein in its entirety. Both liquid dodecane and ethanol were fed by syringe pumps to wick chambers where the liquid hydrocarbons evaporated at 265° C. and 125° C., respectively. Both the feed and the product composition to and from the catalyst reactor were analyzed by a Fourier Transform Infrared Spectroscopy (FTIR).

In FIG. 1, mass flow controllers 10, 12, 14, control feed reactant flow to the catalyst of NO, N$_2$ and oxygen (in air). Water vapor 16 is introduced by bubbling a mixture of air and nitrogen through water at room temperature, while dodecane 18 and ethanol 20 are supplied, for example by syringe pumps, at temperatures of about 265° C. and 125° C., respectively, as controlled by temperature controllers 17 and 19. Catalytic activity was measured between about 150° C. and about 500° C. in a fixed-bed flow reactor 22 at atmospheric pressure. Other temperatures and pressures can be used as appropriate. The reactor was packed with a dual-bed monolith catalyst 23 and 24, wherein catalyst 23 is a single layer catalyst and catalyst 24 is a double layer catalyst, and heated with an electric furnace 26 whose temperature was controlled by measuring the catalyst at the reactor outlet using a thermocouple 28. The feed reactant flow to the catalyst contained about 200 parts per million (ppm) NO, about 6% O$_2$, and 2.5% H$_2$O, about 133 ppm dodecane or a mixture of about 67 ppm dodecane and about 400 ppm ethanol, and the balance N$_2$. Either dodecane alone or a mixture of dodecane and ethanol can be selected to maintain the carbon/NOx feed ratio of about 8 (C$_1$/N=8). In the instant case, dodecane was used as a representative diesel fuel hydrocarbon. Alternately, a mixture of dodecane and ethanol can be used as a representative diesel fuel hydrocarbon reformed by air plasma as disclosed in commonly assigned U.S. patent application Ser. No. 11/155,179 of Byong Kwon Cho et al. entitled "Continuous Reforming of Diesel Fuel for NOx Reduction" (U.S. Patent Publication 2006/0283175 A1, Published Dec. 21, 2006). Both the feed and the product composition to and from the catalytic reactor 22 were analyzed by Fourier Transform Infrared Spectroscopy (FTIR) 30 and vented through vent line 34. Bypass 32 was used to draw the reactant sample before the catalytic reactor 22.

FIG. 2 illustrates a cordierite honeycomb monolith substrate 36 with the circled section enlarged in FIG. 3 to show a single channel 38 coated with Ag/Al$_2$O$_3$ catalyst 40 in a single layer in every channel.

Figure 4:
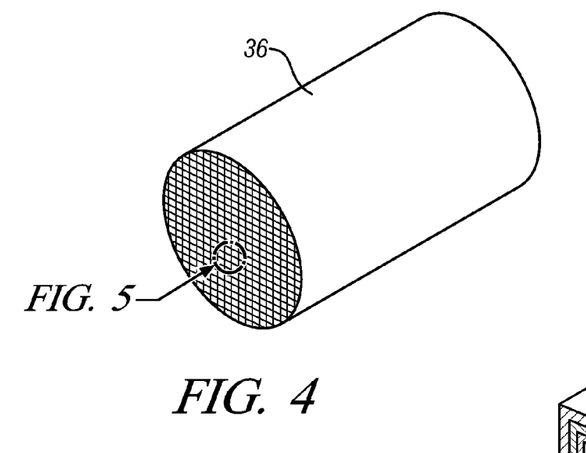
FIG. 4 is a diagram showing a honeycomb monolith substrate having a double-layer catalyst.
Figure 5:
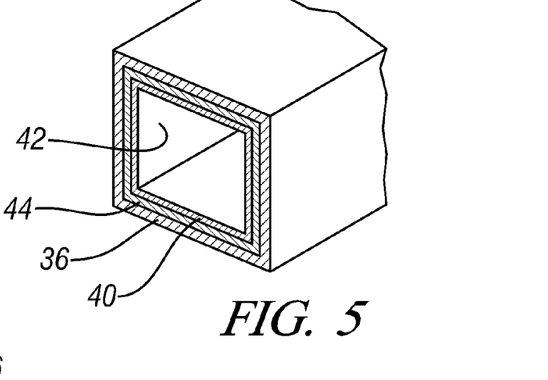
FIG. 5 is an enlarged view of a portion of FIG. 4 showing a single flow channel of the honeycomb monolith substrate having a double-layer catalyst.

FIG. 4 illustrates shows the same substrate 36 but with a double layer coating. In FIG. 5, the circled section of FIG. 4 is enlarged to show a single channel 42 coated with a first layer (i.e., top layer immediately adjacent channel 42) of Ag/alumina catalyst 40 and a second layer (i.e., bottom layer immediately adjacent cordierite substrate 36) of Pt/alumina catalyst 44.

Figure 6A:
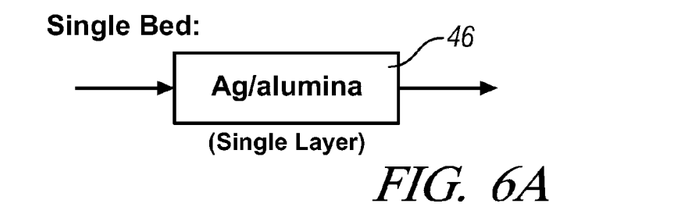
FIG. 6A is a diagram showing one exemplary single bed embodiment.
Figure 6B:
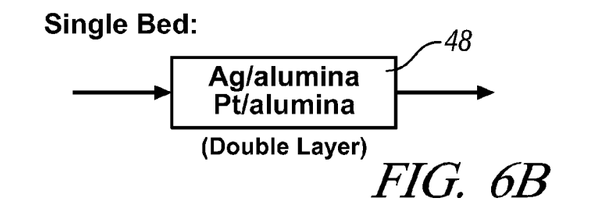
FIG. 6B is a diagram showing another exemplary single bed embodiment.
Figure 6C:
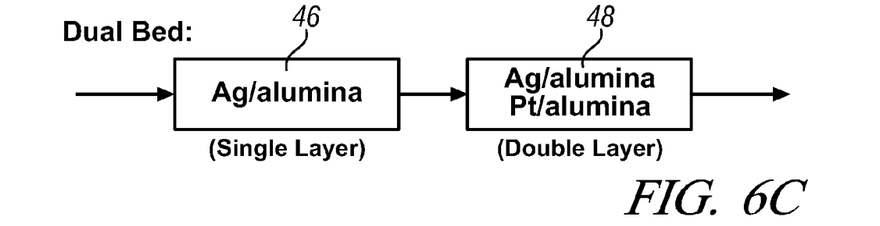
FIG. 6C is a diagram showing one exemplary dual bed embodiment.

FIGS. 6A, 6B and 6C illustrate single bed reactor configurations and a dual-bed configuration in accordance with the present disclosure. Single bed configuration 6A (prior art) includes a single layer Ag/alumina catalyst 46 (25 mm long). Single bed configuration 6B includes a double layer catalyst 48 (25 mm long) including a layer of Ag/alumina and a layer of Pt/alumina. Dual-bed configuration 6C includes a single layer Ag/alumina catalyst 46 in the front bed (12.5 mm long), and a double layer Ag/alumina-on-Pt/alumina catalyst 48 in the rear bed (12.5 mm long).

Figure 7A:
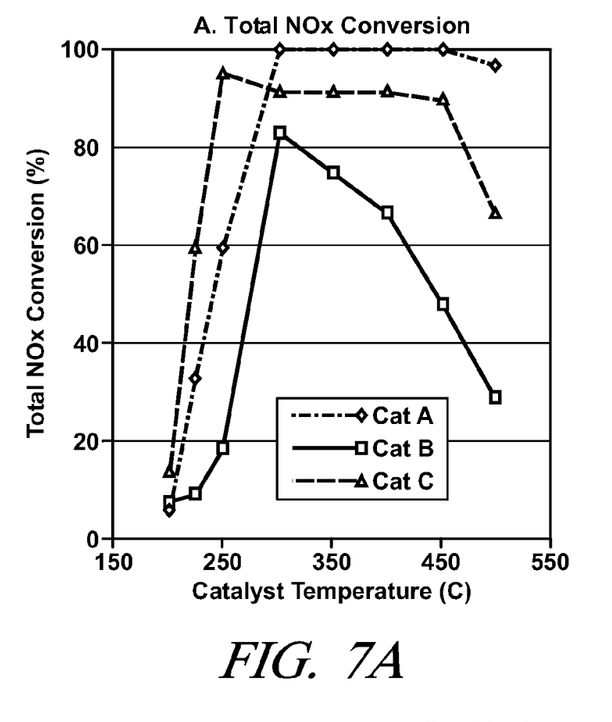
FIG. 7A is a graph showing NOx conversion performance for Catalyst A (a single bed, Ag/alumina single layer catalyst), Catalyst B (a single bed, Ag/alumina-on-Pt/alumina double layer catalyst), and Catalyst C (a dual bed catalyst having a first bed comprising a Ag/alumina single layer catalyst bed and a second bed comprising a Ag/alumina-on-Pt/alumina double layer catalyst bed)
Figure 7B:
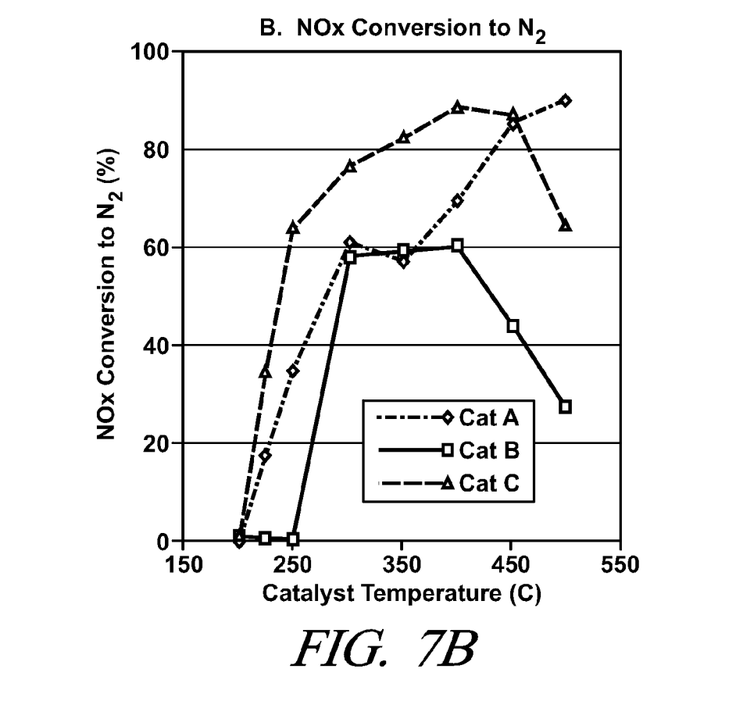
FIG. 7B is a graph showing NOx conversion to $N_2$ for Catalyst A, Catalyst B, and Catalyst C.

FIGS. 7A and 7B compare the total NOx conversion and NOx conversion-to-N$_2$ performance of catalysts A (prior art), B, and dual bed catalyst C of the present disclosure at the space velocity of 60,000/hour. The feed gas stream to the reactor containing 200 ppm NO, $C_1$/NOx=8 (Ethanol:dodecane=1:1 in $C_1$). The total length of each monolith catalyst was 25 mm. Thus, in the case of catalyst C, the front bed contained catalyst A (12.5 mm long monolith catalyst) followed by the rear bed containing catalyst B (12.5 mm long monolith catalyst). Presented in FIG. 7A is the total NOx conversion (or apparent NOx conversion) determined by the disappearance of NOx in the gas phase measured at the reactor outlet. At low temperatures, such as below 300° C., catalyst C of the present disclosure provides the best total NOx conversion, whereas catalyst A is the best at high temperatures, for example above 300° C. FIG. 7B compares the NOx conversion to $N_2$ (or true NOx conversion) over the three catalysts. The performance trend is similar to that observed in FIG. 7A for the total NOx conversion, except that catalyst C of the present disclosure performs better for the true NOx conversion than catalyst A over a much wider temperature range, extending the performance crossover temperature to 450° C. from 300° C. shown in FIG. 7A.

Figure 8A:
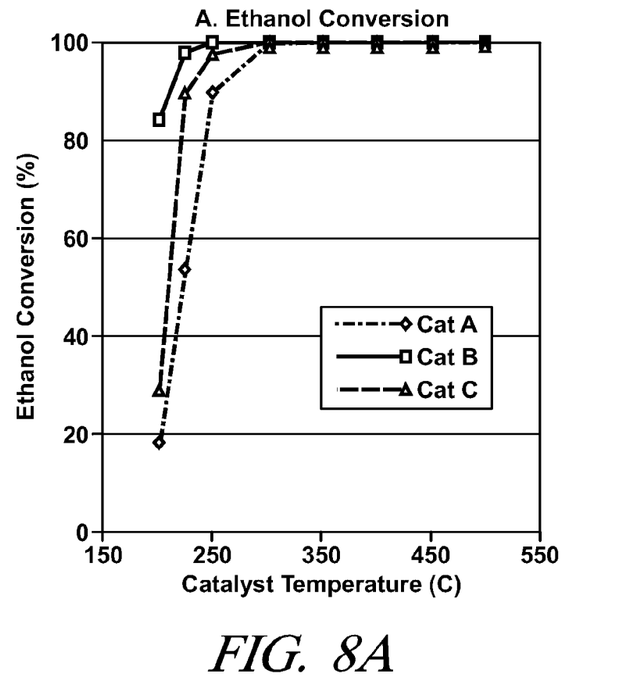
FIG. 8A is a graph showing ethanol conversion over Catalyst A, Catalyst B, and Catalyst C.
Figure 8B:
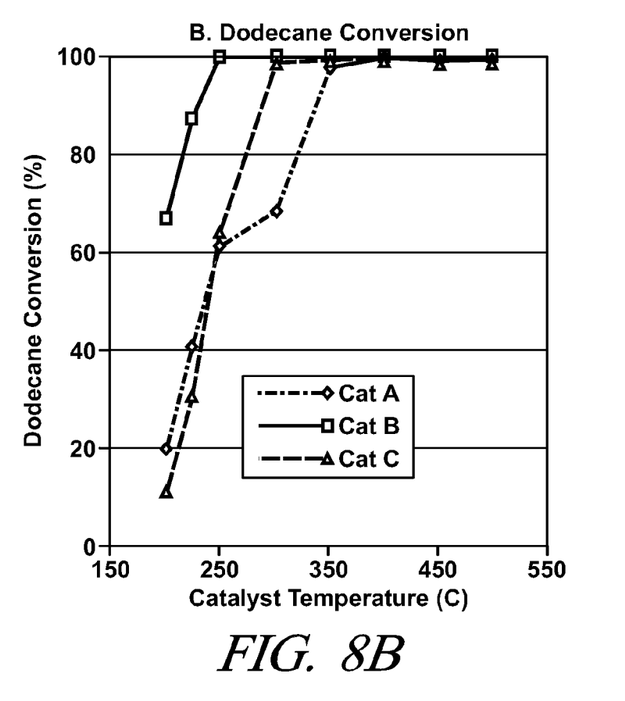
FIG. 8B is a graph showing dodecane conversion over Catalyst A, Catalyst B, and Catalyst C.

FIGS. 8A and 8B compare reductant conversions over the three catalysts A (prior art), B, and dual bed catalyst C of the present disclosure. Catalyst B containing the most amount of Pt is the most active for both ethanol (FIG. 8A) and dodecane conversion (FIG. 8B), while catalyst A containing no Pt is the least active. The strong oxidation activity of catalyst B toward ethanol and dodecane is mainly due to Pt/alumina in the front side of the catalyst bed, and contributes to the consumption of the major part of reductants before the Ag/alumina catalyst gets hot enough to be ready for NOx reduction. This premature consumption of the reductants by catalyst B may explain the poor NOx reduction performance shown in FIGS. 7A and 7B, especially in the low temperature region. On the other hand, catalyst C prevents this premature oxidation of the reductants in the first bed by placing Pt/alumina in the bottom layer of the second bed. The placement of Pt/$Al_2O_3$ in the second bed instead of the first bed helps maintain the production of $NH_3$ by the reaction of NOx with ethanol over the Ag/$Al_2O_3$ catalyst in the first bed by preventing the premature oxidation of ethanol. The produced $NH_3$ can react with NOx in the second bed containing a double-layer Ag/$Al_2O_3$-on-Pt/$Al_2O_3$ catalyst.

Figure 9A:
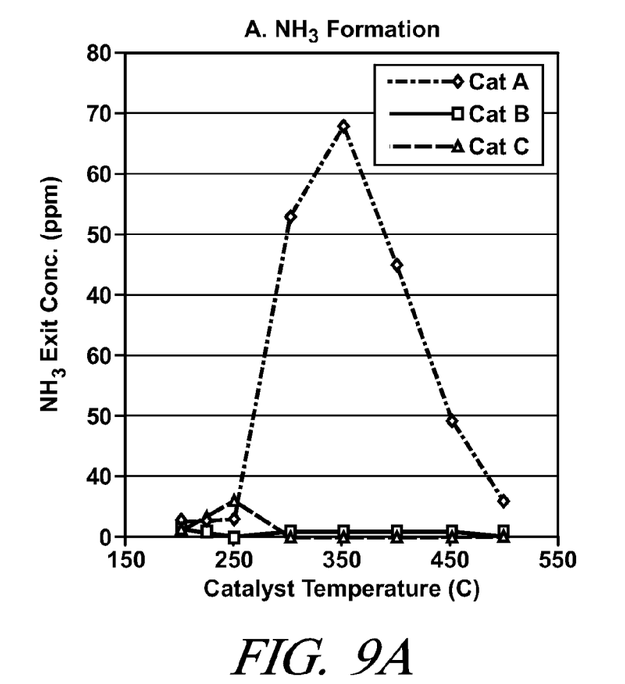
FIG. 9A is a graph showing formation of $NH_3$ byproduct over Catalyst A, Catalyst B, and Catalyst C.
Figure 9B:
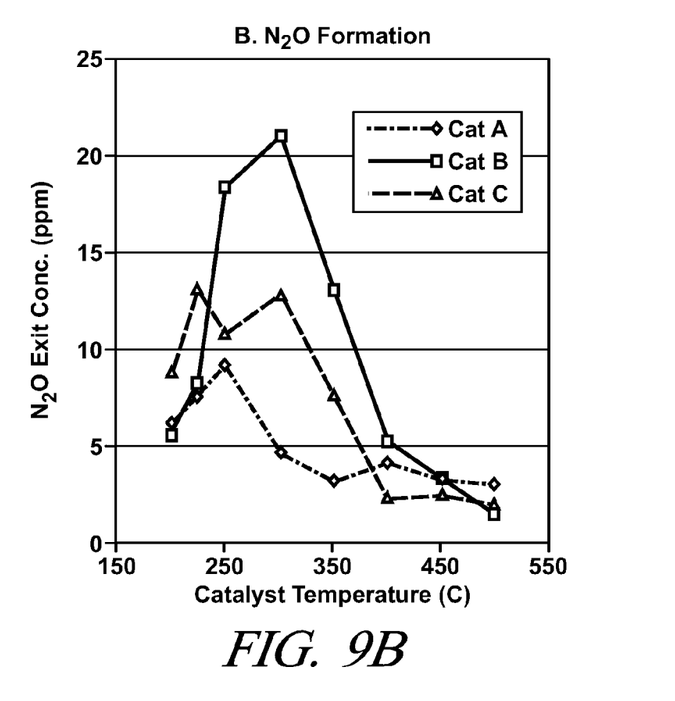
FIG. 9B is a graph showing formation of $N_2O$ byproduct over Catalyst A, Catalyst B, and Catalyst C.

FIGS. 9A and 9B compare the nitrogen-containing byproducts formation such as $NH_3$ and $N_2O$ over the prior art catalysts A and B and dual bed catalyst C of the present disclosure. Catalyst A forms a large amount of $NH_3$ (FIG. 9A), indicating that the relatively poor NOx conversion to $N_2$ (FIG. 7B) compared with its excellent total NOx conversion (FIG. 7A) is mainly due to the formation of $NH_3$. The presence of Pt/alumina in catalysts B and C almost completely eliminates the $NH_3$ emission (FIG. 9A). Dual bed catalyst C of the present disclosure achieves this removal of $NH_3$ emission while improving the NOx-to-$N_2$ conversion performance as shown in FIG. 7B. The presence of Pt/alumina in catalyst B and C increases the $N_2O$ formation as shown in FIG. 9B. With the dual bed catalyst C of the present disclosure, however, this increase of $N_2O$ formation is only moderate.

Figure 10A:
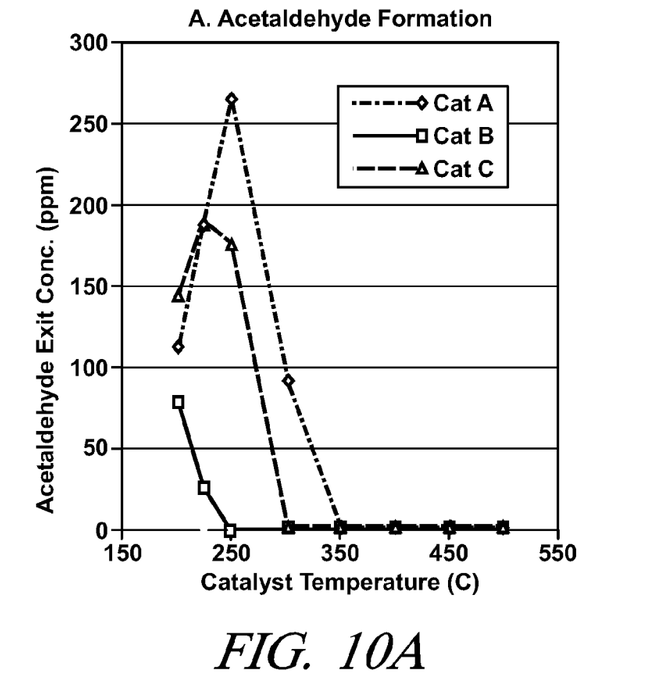
FIG. 10A is a graph showing formation of acetaldehyde byproduct over Catalyst A, Catalyst B, and Catalyst C.
Figure 10B:
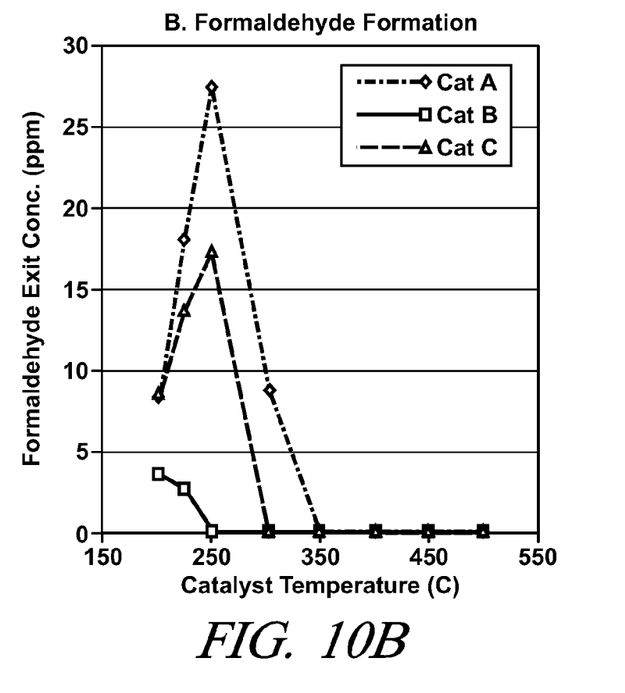
FIG. 10B is a graph showing formation of formaldehyde byproduct over Catalyst A, Catalyst B, and Catalyst C.

FIGS. 10A and 10B compare carbon-containing byproducts formation such as acetaldehyde (AA) and formaldehyde (FA) over prior art catalyst A and single bed catalyst B and dual bed catalyst C of the present disclosure. As shown in FIGS. 10A and 10B, catalyst A containing Ag/alumina makes a large amount of AA and FA, but the presence of Pt/alumina in catalyst B and C help reduce the emission of both AA and FA.

Figure 11:
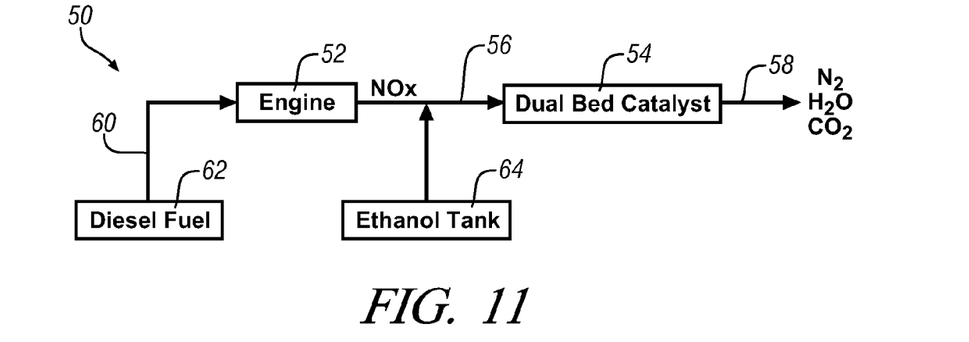
FIG. 11 is a schematic flow diagram of one exemplary vehicle implementation option for the dual bed catalyst for NOx reduction in diesel exhaust with ethanol as the representative oxygenated hydrocarbon for NOx reduction.
Figure 12:
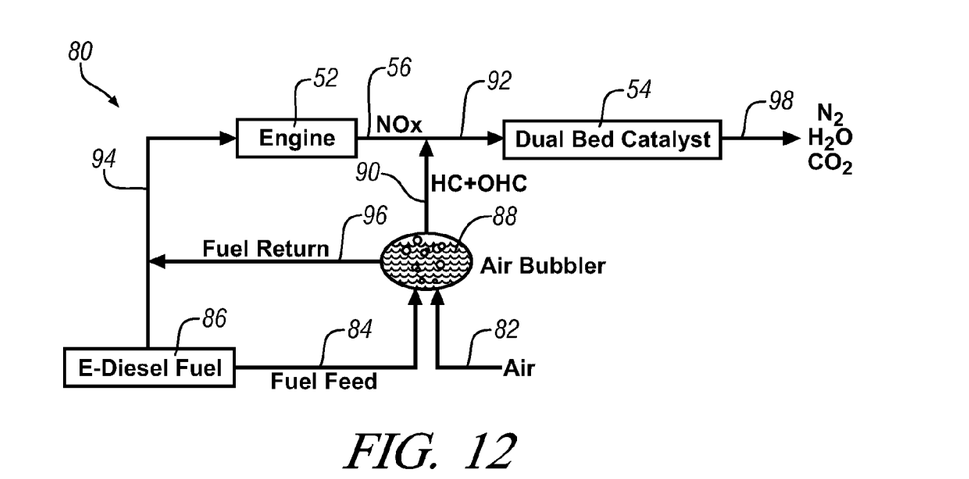
FIG. 12 is a schematic flow diagram of one exemplary vehicle implementation option for the dual bed catalyst for NOx reduction in diesel exhaust with E-diesel fuel and an air bubbler for providing the oxygenated hydrocarbon for NOx reduction.
Figure 13:
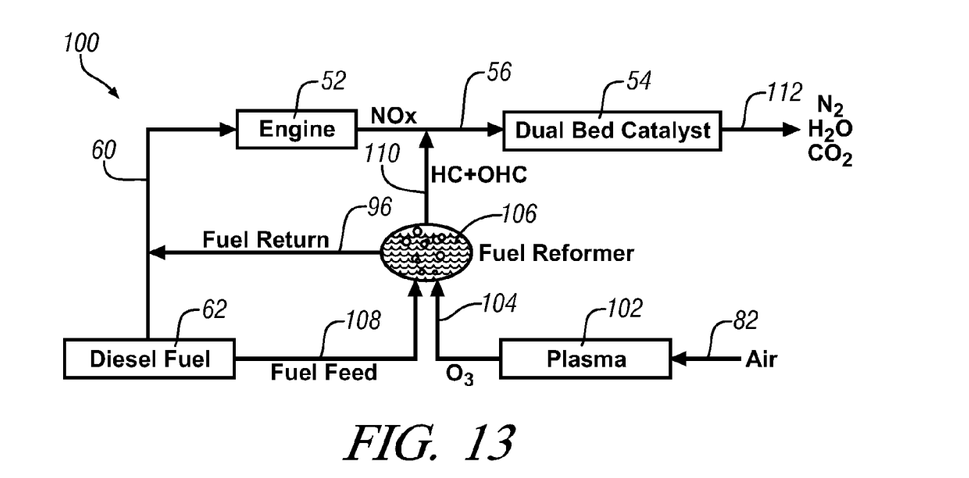
FIG. 13 is a schematic flow diagram of one exemplary vehicle implementation option for the dual bed catalyst for NOx reduction in diesel exhaust with a diesel including a diesel fuel reformer for providing the oxygenated hydrocarbon for NOx reduction.

FIGS. 11 through 13 illustrate in schematic flow diagrams exemplary vehicle implementation options for the present dual-bed SCR catalyst for NOx reduction in diesel engine exhaust using oxygenated hydrocarbons (OHC) as the key reductant. In the Figures, diesel oxidation catalyst for oxidizing NO in the exhaust stream to $NO_2$ is not shown but may be provided, for example downstream of the engine and upstream of the dual bed catalyst. FIG. 11 illustrates an embodiment including the use of ethanol as the representative OHC for NOx reduction. In embodiments, an oxygenated hydrocarbon (OHC) is injected to the exhaust stream. Any suitable OHC can be used in embodiments herein, as used herein suitable OHC meaning alcohols and aldehydes, suitable OHCs including, but not being limited to, for example, ethanol, propanol, butanol, acetaldehyde, propionaldehyde, butyraldehyde, and mixtures and combinations thereof.

FIG. 11 shows a system 50 in accordance with an embodiment of the present disclosure including an engine 52 and a dual bed catalyst 54 as described herein. NOx from engine exhaust stream 56 passes through the dual bed catalyst 54 and emerges as treated stream 58 containing $N_2$, $H_2O$ and $CO_2$. In the system 50, diesel fuel 60 from diesel fuel supply 62 is introduced into engine 52. Ethanol supply 64 introduces ethanol (OHC) to engine exhaust stream 56 upstream of dual bed catalyst 54. The hydrocarbon (HC) and ethanol in the engine exhaust 56 mix with NOx, followed by reaction over the dual bed catalyst 54 producing treated stream 58 containing innocuous $N_2$, $H_2O$ and $CO_2$. In embodiments herein comprising adding an OHC and a hydrocarbon to the exhaust stream, the OHC and hydrocarbon can be added to the exhaust stream separately or as a mixture or combination.

An alternate system 80 in accordance with another embodiment of the present disclosure shown in FIG. 12 includes an engine 52 and downstream a dual bed catalyst 54 as described herein. Air stream 82 and fuel stream 84 from E-diesel fuel supply 86 is treated in air bubbler 88 to provide HC and OHC containing stream 90 which is introduced into engine exhaust stream 56 to form the combined stream 92. Diesel fuel stream 94 including one or a combination of fuel from ethanol-diesel fuel supply 86 and fuel return line 96 fuels engine 52. Hydrocarbon (HC) and oxidated hydrocarbon (OHC) stream 90 which is added to NOx-containing stream 56 before the dual bed catalyst 54 react over the dual bed 54 producing treated stream 98 containing innocuous $N_2$, $H_2O$ and $CO_2$.

FIG. 13 illustrates a system 100 in accordance with yet another embodiment of the present disclosure including an engine 52 and a dual bed catalyst 54 as described herein. Engine 52 is fueled with one or a combination of fuel stream 60 from diesel fuel supply 62 and fuel return stream 96 from diesel fuel reformer 106. In the system 100, air stream 82 is treated in plasma reactor 102 to provide ozone containing stream 104 which is fed into fuel reformer 106. Diesel fuel feed line 108 introduces diesel fuel into fuel reformer 106 and the diesel fuel and ozone are reacted to provide hydrocarbon (HC) and oxygenated hydrocarbon (OHC) stream 110 which is added to NOx-containing engine exhaust stream 56 before the dual bed catalyst 54. Assisted by the air plasma containing $O_3$, the fuel reformer 106 produces OHC's such as alcohols and aldehydes from fuel HC's. The HC and OHC containing stream 110 from the fuel reformer 106 is fed into the engine exhaust stream 56 where they mix with NOx, followed by reaction over the dual bed catalyst 54 producing treated stream 112 containing innocuous $N_2$, $H_2O$ and $CO_2$.

The dual-bed catalyst system disclosed herein provides NOx reduction efficiency that is much better than that of the industry standard Ag/Alumina catalyst. The dual-bed catalyst system consists of a front bed containing a single layer catalyst, in embodiments, Ag/alumina catalyst, and a rear bed containing a double layer catalyst, for example, a top layer of Ag/alumina and a bottom layer of Pt/alumina. The superior performance of the present dual-bed system for NOx reduction has been demonstrated in a laboratory microreactor over the temperature range of about 200° C. to about 500° C. using monolith catalyst samples. Benefits include, in embodiments, use of on-board diesel fuel as the source of NOx reductant. Thus, eliminating the requirement for any additional on-board tank to carry a reductant such as urea required for the urea/SCR technology. Further eliminated is the need for a urea distribution infrastructure required for urea/SCR technology.

The present disclosure uses a continuous catalytic process for NOx reduction. As such, this technology requires neither the sophisticated engine control nor the periodic regeneration of NOx storage catalysts as required for LNT technology. A further advantage is that a separate $NH_3$ or HC cleanup catalyst is not required. Successful implementation of the present technology provides an alternative method for NOx emission control for diesel engine exhaust.

In embodiments, the oxygenated hydrocarbons can be provided in an onboard tank separate from the fuel tank, or they can be mixed with the diesel fuel such as in E-diesel, or they can be produced from raw diesel fuel using a fuel reformer assisted by air plasma. See, for example, commonly assigned U.S. Pat. No. 7,093,429 of Byong Kwon Cho, entitled 'Reforming Diesel Fuel for NOx Reduction,' the disclosure of which is incorporated herein by reference, and commonly assigned U.S. patent application Ser. No. 11/155,179 of Byong Kwon Cho et al. entitled "Continuous Reforming of Diesel Fuel for NOx Reduction" (U.S. Patent Publication 2006/0283175 A1, Published Dec. 21, 2006).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for reducing nitrogen oxides including NO and $NO_2$ in an exhaust stream also comprising oxygen, carbon monoxide and hydrocarbons at a temperature above about 150° C., the method comprising:
    oxidizing NO in the exhaust stream to $NO_2$;
    adding diesel fuel hydrocarbons and their oxygenates to the exhaust stream for the reduction of nitrogen oxides; and
    flowing the exhaust stream through a dual bed catalyst system comprising a front bed and a rear bed to reduce the nitrogen oxides to $N_2$, wherein the front bed is a single layer catalyst bed and the rear bed is a double layer catalyst bed comprising a first layer including a first layer catalyst produced from the same materials as the single layer catalyst of the front bed and a second layer including a second layer catalyst, the single layer catalyst continuously forming $NH_3$ when the exhaust stream reacts with the single layer catalyst and the second layer catalyst of the rear bed reacts with the formed $NH_3$ to substantially eliminate the formed $NH_3$ to produce $N_2$.

2. The method of claim 1:
    wherein the front bed comprises a single layer catalyst selected from the group consisting of $Ag/Al_2O_3$, Ag/Y, Ag/ZSM5, Ag/Ba/Y, or a combination thereof; and
    wherein the rear bed comprises a double layer catalyst wherein the first layer is selected from the group consisting of $Ag/Al_2O_3$, Ag/Y, Ag/ZSM5, Ag/Ba/Y, or a combination thereof and the second layer is selected from the group consisting of $Pt/Al_2O_3$, $Pt/Ba/Al_2O_3$, Cu/ZSM5, CuCo/Y, $Pd/Al_2O_3$, or a combination thereof.

3. The method of claim 1:
    wherein the front bed comprises a single layer catalyst of $Ag/Al_2O_3$; and
    wherein the rear bed comprises a double layer catalyst wherein the first layer is $Ag/Al_2O_3$ and the second layer is $Pt/Al_2O_3$.

4. The method of claim 1, wherein the exhaust stream is a diesel engine exhaust stream.

5. The method of claim 1, wherein oxidizing NO in the exhaust stream to $NO_2$ comprises treating the exhaust stream with an oxidation catalyst.

6. The method of claim 1, further comprising adding an OHC to the exhaust stream as vapor in an air stream.

7. The method of claim 1, comprising adding an OHC and a hydrocarbon to the exhaust stream, wherein the OHC and hydrocarbon can be added to the exhaust stream separately or as a mixture or combination thereof.

8. The method of claim 7, wherein the OHC is ethanol, and the hydrocarbon is dodecane.

9. The method of claim 1, comprising reducing nitrogen oxides including NO and $NO_2$ in an exhaust stream also comprising oxygen, carbon monoxide and hydrocarbons at a temperature above about 200° C.

10. A NOx reduction catalyst for a hydrocarbon-fueled automotive engine operated at a fuel-lean air-to-fuel ratio, the catalyst comprising a dual bed catalyst system comprising a front bed and a rear bed to reduce the nitrogen oxides to $N_2$, wherein the front bed is a single layer catalyst bed and the rear bed is a double layer catalyst bed comprising a first layer including a first layer catalyst produced from the same materials as the single layer catalyst bed and a second layer including a second layer catalyst, the single layer catalyst continuously forming $NH_3$ when the exhaust stream reacts with the single layer catalyst and the second layer catalyst of the rear bed reacts with the formed $NH_3$ to substantially eliminate the formed $NH_3$ to produce $N_2$.

11. The catalyst of claim 10:
    wherein the front bed comprises a single layer catalyst selected from the group consisting of $Ag/Al_2O_3$, Ag/Y, Ag/ZSM5, Ag/Ba/Y, or a combination thereof; and
    wherein the rear bed comprises a double layer catalyst wherein the first layer is selected from the group consisting of $Ag/Al_2O_3$, Ag/Y, Ag/ZSM5, Ag/Ba/Y, or a combination thereof and the second layer is selected from the group consisting of $Pt/Al_2O_3$, $Pt/Ba/Al_2O_3$, Cu/ZSM5, CuCo/Y, $Pd/Al_2O_3$, or a combination thereof.

12. The catalyst of claim 10:
    wherein the front bed comprises $Ag/Al_2O_3$; and
    wherein the rear bed comprises a double layer catalyst wherein the first layer is $Ag/Al_2O_3$ and the second layer is $Pt/Al_2O_3$.

13. A system for reducing nitrogen oxides including NO and $NO_2$ in an exhaust stream also comprising oxygen, carbon monoxide and hydrocarbons at a temperature above about 150° C., comprising a dual bed catalyst system comprising a front bed and a rear bed to reduce the nitrogen oxides to $N_2$, wherein the front bed is a single layer catalyst bed and the rear bed is a double layer catalyst bed comprising a first layer including a first layer catalyst produced from the same materials as the single layer catalyst bed and a second layer including a second layer catalyst, the single layer catalyst continuously forming $NH_3$ when the exhaust stream reacts with the single layer catalyst and the second layer catalyst of the rear bed reacts with the formed $NH_3$ to substantially eliminate the formed $NH_3$ to produce $N_2$.

14. The system of claim 13:
    wherein the front bed comprises a single layer catalyst selected from the group consisting of $Ag/Al_2O_3$, Ag/Y, Ag/ZSM5, Ag/Ba/Y, or a combination thereof; and
    wherein the rear bed comprises a double layer catalyst wherein the first layer is selected from the group consisting of $Ag/Al_2O_3$, Ag/Y, Ag/ZSM5, Ag/Ba/Y, or a combination thereof and the second layer is selected from the group consisting of $Pt/Al_2O_3$, $Pt/Ba/Al_2O_3$, Cu/ZSM5, CuCo/Y, $Pd/Al_2O_3$, or a combination thereof.

15. The system of claim 13:
    wherein the front bed comprises Ag/Al2O3; and
    wherein the rear bed comprises a double layer catalyst wherein the first layer is $Ag/Al_2O_3$ and the second layer is $Pt/Al_2O_3$.

16. The system of claim 13, wherein the exhaust stream is a diesel engine exhaust stream.

17. The system of claim 13, further comprising an oxidation catalyst for oxidizing NO in the exhaust stream to $NO_2$.

18. The system of claim 17, wherein the oxidation catalyst is selected from the group consisting of Pt, Pd, Rh, or a mixture or combination thereof.

19. The system of claim 13, further comprising a non-thermal plasma reactor, wherein oxidizing NO in the exhaust stream to $NO_2$ comprises passing air through the non-thermal plasma reactor to generate ozone-containing air plasma and adding the air plasma to the exhaust stream for oxidation of NO to $NO_2$.

20. The system of claim 13, further comprising a fuel reformer for adding an OHC to the exhaust stream as vapor in an air stream.

21. The system of claim 13, further comprising a fuel reformer for adding an OHC and a hydrocarbon to the exhaust stream, wherein the OHC and hydrocarbon are added to the exhaust stream separately or as a mixture or combination thereof.

22. The system of claim 21, wherein the OHC is ethanol, and the hydrocarbon is dodecane.

* * * * *